July 26, 1949.   C. E. SUCCOP   2,477,153
MILLING TOOL
Filed Dec. 27, 1943   2 Sheets-Sheet 1
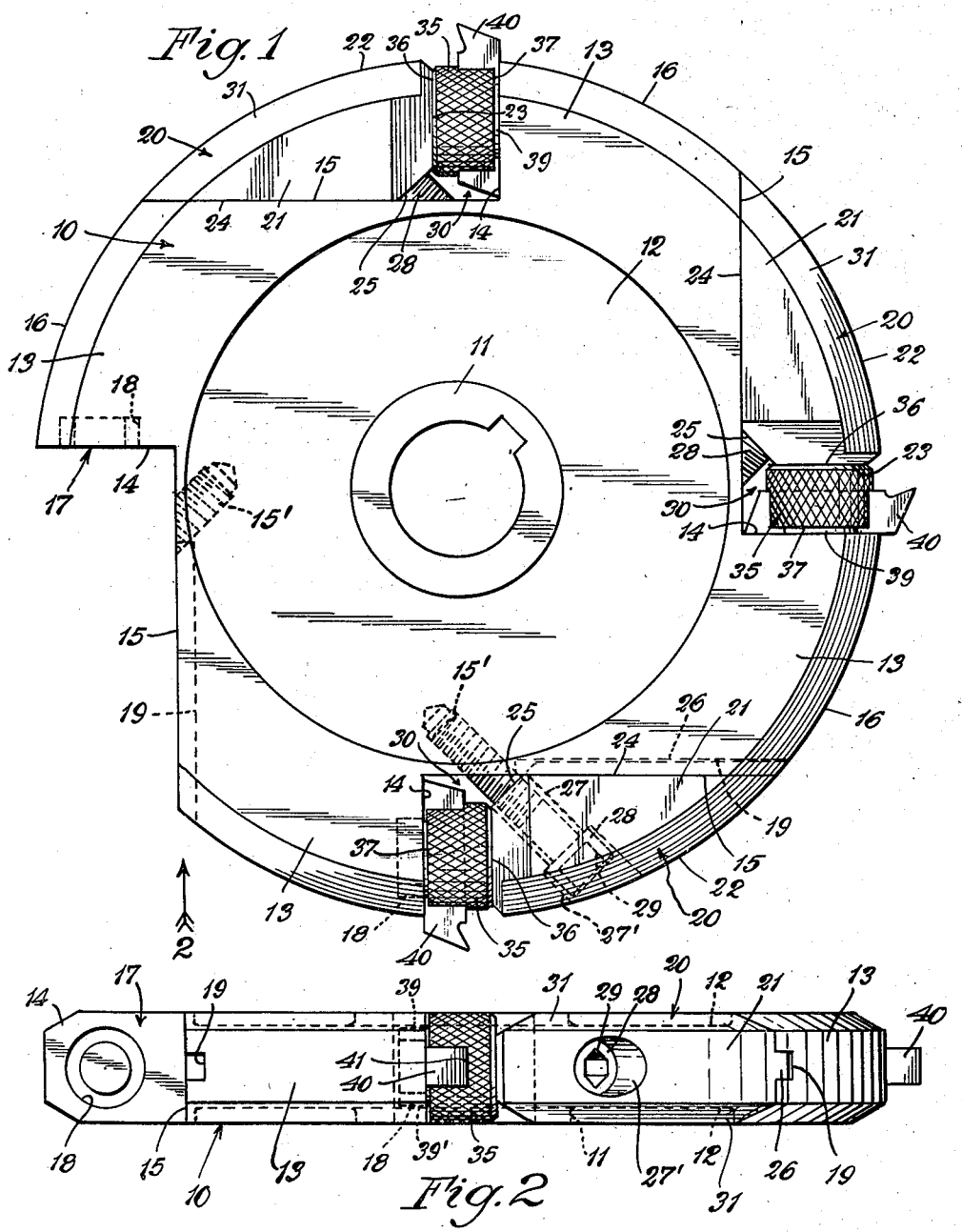
Inventor
Charles E. Succop
by
Attorney.

July 26, 1949. C. E. SUCCOP 2,477,153
MILLING TOOL
Filed Dec. 27, 1943 2 Sheets-Sheet 2
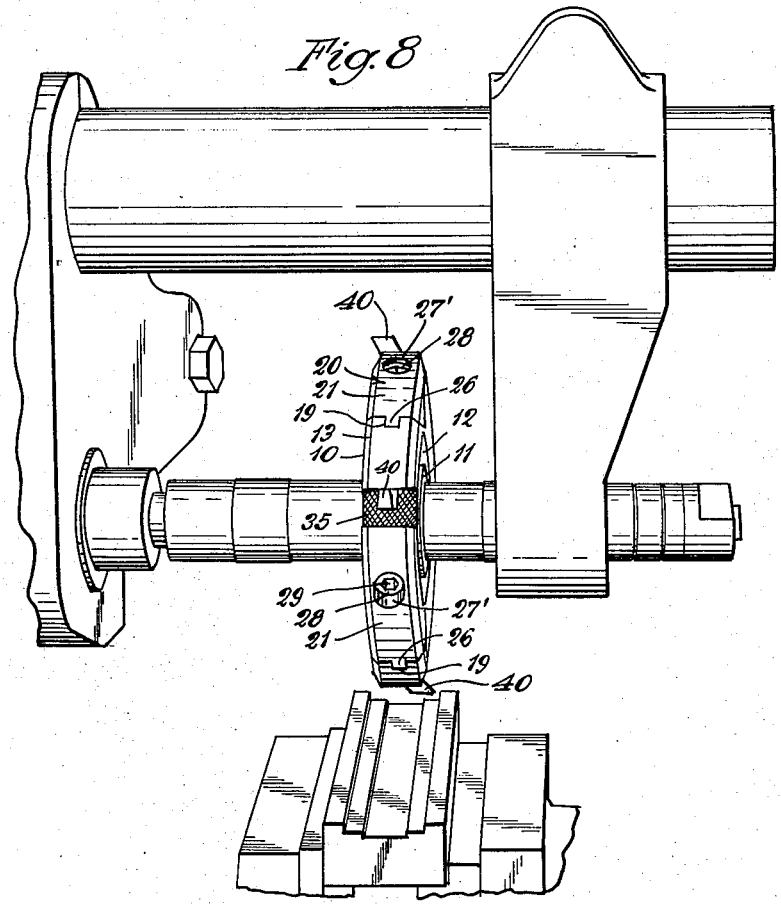
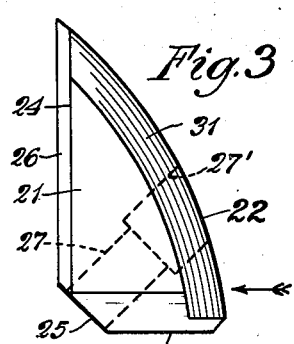
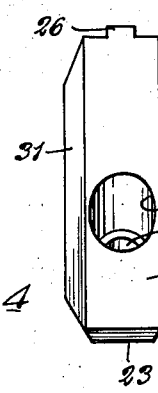
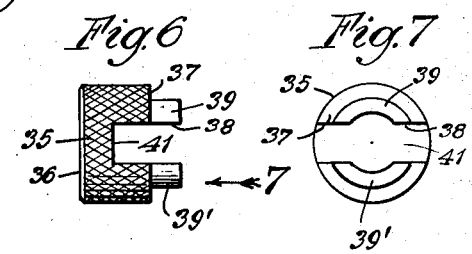
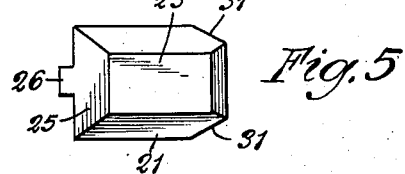
Inventor
Charles E. Succop
by
Attorney Patented July 26, 1949

2,477,153

UNITED STATES PATENT OFFICE 2,477,153

MILLING TOOL

Charles E. Succop, Los Angeles, Calif., assignor to Anna Louise Succop

Application December 27, 1943, Serial No. 515,709

3 Claims. (Cl. 29—105)

My invention relates to improvements in a milling tool, and more particularly to a universal cutter which as a single tool, supplied with bits, with various adjustments may be used to perform numerous types of milling or cutting operations.

Conventional rotary cutters comprise wheels which have permanently fixed or integral teeth, and when they are worn or broken the tool loses its usefulness unless rebuilt or repaired. Moreover each tool is designed and useful for only one operation and that is limited to a given operation of a single dimension according to the shape of the edge, the set, and width of the teeth. When such tools are ground to sharpen them, they lose their original size and their utility is thus further restricted.

It is a broad and important object of my invention to provide a milling tool of universal character which embodies a carrier which may be mounted on a conventional arbor, and in which various types of bits may be quickly installed, replaced, and adjusted radially and laterally.

More particularly, an object of the invention is to provide a tool of the character described in which complicated cuts can be broken down into simple units by inserting a specially ground bit for each portion of the job.

Another object of the invention is to provide a single tool which eliminates expensive grinding of special cutters, reduces the previously necessary inventory of special form tools, and which may be used as a fly cutter, for flat surfaces, for straddle milling, for slot cutting either straight or annular, and for various other purposes which will be apparent to a machinist. My invention thus not only reduces requirements for critical materials, but the cost as well, and affords a tool for many complicated operations not even possible with any one tool known to me, thus realizing a substantial saving in machining time and labor.

These, and other objects and advantages, will become further apparent from the description which follows, taken in conjunction with the drawings.

In the drawings:

Figure 1 is a front elevation of the preferred form of my tool with one of the bit retaining assemblies removed.

Figure 2 is an edge elevation of the same tool taken in the direction of the arrow 2 in Figure 1 and with the same bit retaining assembly removed.

Figure 3 is a side elevation of one of the slugs or wedges forming part of the bit retaining assembly.

Figure 4 is an edge view of the same taken in the direction of the arrow 4 of Figure 3.

Figure 5 is an end elevation of the same part shown in Figures 3 and 4.

Figure 6 is a side elevation of one of the tool posts or inserts forming part of the bit retaining assembly.

Figure 7 is an end view of the same tool post taken in the direction of the arrow 7 of Figure 6.

Figure 8 is a perspective view of my invention shown mounted on an arbor in relation to a piece of work being operated on.

The tool comprises essentially a carrier 10 including a hub portion 11 enabling the carrier to be keyed or clamped on a conventional arbor by any well known means. For many purposes, a key is not desired, and friction clamping is preferred so that the tool will slip if an excessively hard spot in the work is encountered by the bit. I provide annular recesses 12 in the faces of the carrier for reception of any suitable disc type clamping members known in the art.

Extending outwardly from the center of the carrier are arms 13 having parallel plane faces 14 and 15 and terminating in an arcuate segment 16 struck on the axis of the hub. My preferred form includes four of these arms, whereby the short face 14 joins an adjacent long face 15 at a 90° angle forming a notch 17. In each of the short faces 14 is formed a relatively deep annular slot 18 for a purpose later explained. The long faces 15 are tapped and threaded as illustrated at 15', to receive a cap screw at an angle of 45° to the plane of the face, and these faces are also formed with a longitudinal groove 19 for a purpose which will appear.

The bit retaining assembly is generally designated by the reference numeral 20 and comprises the parts next to be described.

The slug or wedge 21 comprises a deformed segment having an exterior arcuate surface 22 coinciding with the theoretical periphery of the carrier, a short plane face 23, and a long plane face 24 at an angle of 90° to the first. The junction of this angle is hypothetical, if the corner is bevelled as at 25, which is optional. The face 23 is flat and unbroken. The face 24 is provided with a longitudinal tongue 26 adapted to engage in the groove 19 for guiding the slug and holding it in correct lateral registration with the carrier. The slug or wedge is also formed with a hole 27 having a cross section elongated in the radial plane of the carrier, running at an angle of 45° to the face 24 to coincide with the threaded tap 15'. These holes are countersunk, as at 27', to receive the head of a special capscrew 28 which has an upset head with a hexagonal wrench recess 29 adapted to receive an Allen wrench. As indicated on Fig. 1, the hole 27 is somewhat larger than the shank of the bolt of the cap screw, there being adequate clearance to permit of tightening of the slug or wedge along surface 24 toward the outwardly extending face 14. When the wedge is in place, its face 23 is parallel to the face 14 of the carrier arm and these faces are about equidistant from a diameter of the carrier projected parallel to them. Their separation provides a radial slot 30 for the reception of the tool post or insert constituting a cutter carrier mentioned.

The carrier arms and wedges are preferably bevelled as at 31 to afford clearance when making cuts with the bits angled laterally as later explained.

The tool post, or cutter carrier 35, is preferably in the form of a knurled cylinder. One end 36 is adapted to abut against the wedge face 23, and the other end 37 adjacent to (or against) the carrier arm face or wall 14. A diametrical slot 38 is cut through the cylinder to form a bit socket, this slot being open at the end 37. Circular segmental tongues 39 and 39' extend from the end 37 for engagement in the annular slot 18 in the carrier arm wall 14, to fix the axis position of the cylinder. The interfitting engagement between the tongues 39 and 39' and the annular recess 18 guides and restricts each cutter carrier to a rotatable adjustment about its own axis relative to the carrier 10.

Any suitable bit or cutter 40, which should have a shank with a square or rectangular cross section, may be inserted in the socket 38.

In operation, the bit retaining assemblies are installed on the carrier in the relationship described and illustrated, but with the cap screws loosened to free the inserts 35. One turn from tight is usually sufficient for this purpose. The bits 40 are inserted in the sockets 38 and positioned as desired, then the cap screws are tightened. Tightening the cap screws draws the wedges in, closing the radial slots 30 and tightly clamping the inserts 35 and the bits 40 therein. The shanks of the bits should be slightly thicker than the depth of the sockets so that they will be held between the carrier faces 14 and the bottoms 41 of the insert slots 38. There will then be a slight clearance between the ends 37 of the inserts and the carrier faces 14.

While this is preferred, I would consider it equivalent to have the bit shank entirely within the slot, being held therein by any conventional setscrew, and the clamping face 14 bear directly on the end 37 of the insert.

Insertion, adjustment, and replacement of the bits may be accomplished whether the carrier is on or off the arbor. The bits may be adjusted for depth, and for lateral position. Thus, they may be set to cut radially of the tool, or at a lateral angle thereto, or one or more may be set in one position, and others at other positions. They may be all the same type of bit, or may vary, according to the cut or combination of cuts desired. They may be straight flat edged, V-shaped, or curved. A wide variety of types of bits and cutting combinations is possible. One or more of the inserts may contain bits. While this tool will ordinarily be used on a revolving arbor, at varying speeds according to the work, it may be non-rotatably mounted and operated linearly over the work, or the work drawn against it. Its great advantage is in its universal adaptability to varying requirements.

While I have described its component parts in identifying language, it will be observed that the tool as a whole comprises a wheel mountable upon an arbor, having demountable peripheral bit sockets adapted to be quickly loosened or tightened, and providing not only for independent insertion or removal of bits, but their independent adjustment radially, as well as laterally on an axis parallel to the tangent of the wheel. It will operate in either direction. It would be a wheel, within my meaning, even if the periphery were broken by cutting away intermediate portions not necessary to the functions described.

In a broader sense, my invention comprises a bit holder affording both longitudinal and lateral adjustments of the bit.

Although I have herein shown and described my invention in which I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A tool comprising a rotary carrier having faces extending outwardly from its axis of rotation, cutter holders positioned against said faces, clamping means adapted to be tightened towards said faces to clamp the cutter holders therebetween, said cutter holders and faces having interfitting portions guiding and restricting the cutter holders for axial adjustment whereby on loosening the clamping means each cutter holder may be rotatably adjusted about its axis relatively to the carrier.

2. A tool comprising a rotary carrier having faces extending outwardly from its axis of rotation, cutter holders positioned against said faces, clamping means adapted to be tightened towards said faces to clamp the cutter holders therebetween, said faces having annular recesses therein and the cutter holders having passages therethrough adapted to receive cutters and having portions fitting said recesses restricting the cutter holders to axial adjustments relative to said carrier when the clamping means is loosened.

3. A tool comprising a rotary carrier having faces extending outwardly from its axis of rotation, cutter holders positioned against said faces, clamping means adapted to be tightened towards said faces to clamp the cutter holders therebetween, said faces having annular recesses therein and the cutter holders having passages therethrough adapted to receive cutters and having portions at the sides of said passages fitting said recesses restricting the cutter holders to axial adjustments relative to said carrier when the clamping means is loosened.

CHARLES E. SUCCOP.

(References on following page)

REFERENCES CITED

The following references are of record in the file of this patent:

UNITED STATES PATENTS

| Number | Name | Date |
|---|---|---|
| 417,748 | Sicotte | Dec. 24, 1889 |
| 470,462 | Barnes | Mar. 8, 1892 |
| 487,402 | Byerly | Dec. 6, 1892 |
| 621,288 | Robertshaw | Mar. 14, 1899 |
| 663,455 | Muehlberg | Dec. 11, 1900 |
| 709,526 | Taylor et al. | Sept. 23, 1902 |
| 751,054 | Carr | Feb. 2, 1904 |
| 830,778 | Geer | Sept. 11, 1906 |
| 899,608 | Newbold | Sept. 29, 1908 |
| 1,063,659 | Conklin | June 3, 1913 |
| 1,190,197 | Shimer | July 4, 1916 |
| 1,397,786 | Santon | Nov. 22, 1921 |
| 2,257,169 | Hopps | Sept. 30, 1941 |
| 2,325,746 | Curtis | Aug. 5, 1943 |
| 2,412,525 | Maslin | Dec. 10, 1946 |

FOREIGN PATENTS

| Number | Country | Date |
|---|---|---|
| 239,258 | Great Britain | Sept. 7, 1925 |
| 721,584 | France | Dec. 22, 1931 |
| 579,069 | Germany | June 21, 1933 |